G. S. ENGLE.
PRIMARY BATTERY.
APPLICATION FILED APR. 10, 1909.
1,052,330.
Patented Feb. 4, 1913.
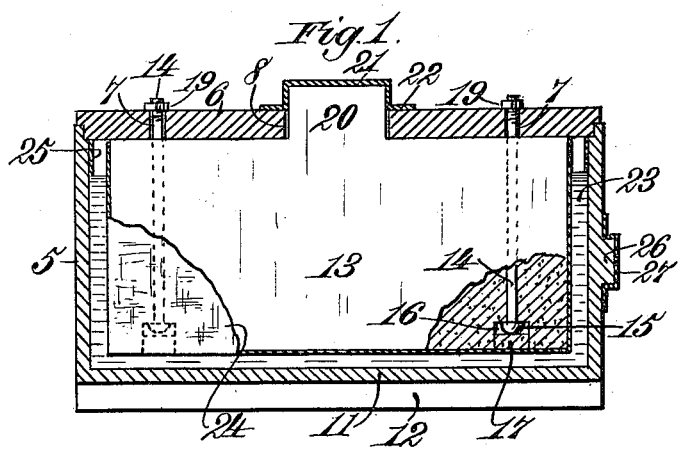
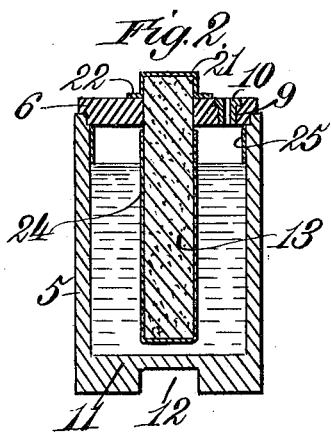
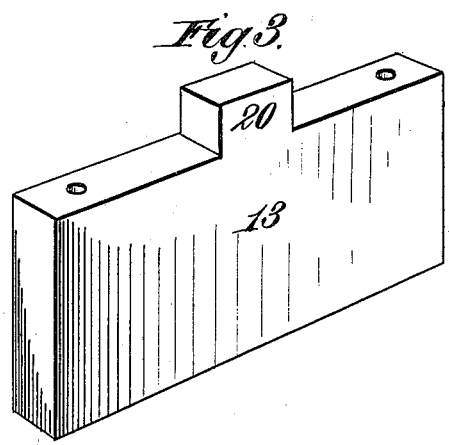
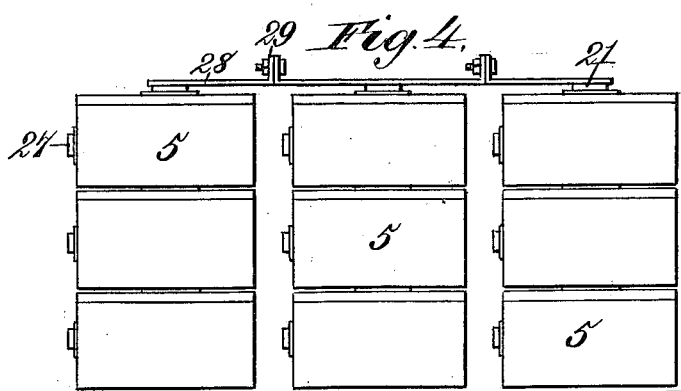
Witnesses:
Robert Everitt,
Inventor:
George S. Engle.
By James L. Norris.
Att'y.

UNITED STATES PATENT OFFICE.

GEORGE S. ENGLE, OF PROVIDENCE, RHODE ISLAND, ASSIGNOR TO AMERICAN ELEMENTARY ELECTRIC COMPANY, OF WASHINGTON, DISTRICT OF COLUMBIA, A CORPORATION OF THE DISTRICT OF COLUMBIA.

PRIMARY BATTERY.

1,052,330.  Specification of Letters Patent.  Patented Feb. 4, 1913.

Original application filed December 4, 1908, Serial No. 465,938. Divided and this application filed April 10, 1909. Serial No. 489,140.

*To all whom it may concern:*

Be it known that I, GEORGE S. ENGLE, a citizen of the United States, residing at Edgewood, Providence, in the county of Providence and State of Rhode Island, have invented new and useful Improvements in Primary Batteries, of which the following is a specification.

This invention relates to a primary battery adapted for illuminating, motive and other purposes, and contemplates the provision of a cell of minimized proportions embodying zinc or zinc combined with any other metal or substance and carbon elements for poles and a cold alkaline electrolyte solution.

The invention also involves the art of generating electricity by means of a cold alkaline electrolyte solution coöperating with zinc positive and carbon negative elements for poles in a specific manner or by lessening the internal resistance by forming a more perfect conducting fluid, the essential element of which is hydroxid of zinc combined with an alkali to form an alkaline zincate which is soluble and prevented from penetrating the pores and depositing on the negative or carbon element by interposing a restrictive medium which does not affect the chemical action of the gases on the same element.

The invention still further involves the art of economically generating electricity and preventing undue attack on the positive or zinc element by obstructing the creeping up and exterior exudation of the electrolyte carrying the alkaline zincate which forms into powder when reaching the air by amalgamating the top portion of the interior of the zinc cell with mercury.

Other advantages and important structural features will be hereinafter more fully explained in the subjoined description, and in the accompanying drawings one practical embodiment of the invention is illustrated for the purpose of demonstrating an operative device and particularly the advantages of combining a plurality of the cells in groups within a given space. It will be understood, however, that modifications and structural changes are possible within the scope of the invention.

This invention particularly relates to matter divided out of my copending application Serial Number 465,938, filed December 4, 1908.

In the drawings: Figure 1 is a longitudinal vertical section of a battery cell embodying the features of the invention. Fig. 2 is a transverse vertical section of the same. Fig. 3 is a detail view of the carbon element or negative pole. Fig. 4 is an elevation showing a plurality of the cells connected in parallel and series.

Each cell of the battery comprises a casing or receptacle 5 composed of zinc, or a combination of zinc with any other metal or substance and which will be hereinafter termed a "zinc element or pole", the said receptacle having minimized dimensions though capable of enlargement to adapt it for different applications. In the upper open extremity of the receptacle 5 a cover 6 is fitted and projects at its perimeter just far enough above the upper edge of the receptacle to prevent contact with the latter by superimposed receptacles of a similar character as will be more fully hereinafter explained. The cover 6 is constructed from any suitable insulating composition and has bolt openings 7 formed therein on opposite sides of the center, a central mortise 8 and an opening 9 to receive a porcelain filling tube or nipple 10 shouldered at its upper extremity and fitted flush with the top surface of the cover.

The receptacle 5 has a fully closed bottom 11 with a longitudinal groove 12 formed in the center thereof and extending completely from end to end. The receptacle 5 constitutes the positive element or pole of the cell and suspended therein is a carbon plate 13 constituting the negative element or pole of the cell, bolts 14 extending through the openings 7 of the cover and the said plate and having their heads 15 countersunk in sockets 16 in the lower edge of the said plate 13, the sockets 16 being filled by carbon plugs 17 so as to completely inclose metallic heads of the bolts to prevent ready contact of the latter with the electrolyte within the cell. The carbon plugs 17 are dense, and when applied are securely fastened in the sockets 16. Owing to the density of the plugs 17, considerable time will elapse before they become thoroughly saturated with the electrolyte or permit the latter to reach the metallic heads of the bolts 14, and hence for all practical purposes the bolt heads are shielded. The upper extremities of the bolts 14 are screw-threaded and engaged by thin nuts and washers 19 bearing on the upper surface of the cover 6. The electrolyte does not fully occupy the interior of the receptacle 5, there being a space between the maximum level of the said electrolyte and the lower surface of the cover, and hence the upper extremities of the bolts 14 are not affected by the electrolyte. The carbon plate 13 has a tenon or tongue 20 rising from the center of the upper edge thereof which is snugly projected through the mortise 8 and thereover is secured a copper cap 21 having a base flange 22 bearing upon and held down against the upper surface of the cover 6 and serving as a conductor of an advantageous character in a manner which will be presently explained. As shown by Fig. 2, ample space is provided within the receptacle 5 for the electrolyte 23 which may be of any suitable alkaline character.

The ends, sides and bottom edge of the carbon plate 13 are separated from the inner surfaces of the adjacent walls and bottom of the receptacle 5, or in other words, the carbon does not have contact at any point with the zinc receptacle. The carbon plate 13 is inclosed or covered by an envelop or sack 24 composed of cotton fabric which fully extends over the said carbon plate to the cover 6 as shown and acts as a protective medium with relation to the carbon plate and prevents excessive charging of the carbon pole with the zincate of the alkali metal. The fabric envelop or sack 24 serves as a strainer to prevent the heavier particles of the electrolyte from congregating immediately adjacent to the carbon plate and thereby allow a greater freedom of action of the liquid portion of the electrolyte relatively to the said plate. This envelop or restrictive medium composed of cotton fabric does not obstruct the escape of the gases that may be generated within the cell. Under excessive pressure a portion of the gas may escape through the joint between the porcelain filling tube or nipple 10 and the casing cover 6, but there is no ingress of the exterior atmosphere or any other matter into the cell after the latter has been sealed or closed by the cover 6. The minimized gas escape between the filling tube or nipple 10 and the wall of the opening in the casing or cover 6 in which said tube or nipple is fitted has been found in practice to be ample for relieving the battery of a portion of the gas generated therein and which it is desirable to liberate. It is well known that gas will pass through a very minute crevice, and it is also impossible to make an absolutely tight joint between the nipple and the wall of the casing or cover and the crevice that remains is sufficient to permit the escape of the excess gas.

It will be understood that the electrolyte may be introduced into the receptacle 5 through the filling tube or nipple 10 in the cover 6, and after the electrolyte has been thus supplied to the cell the tube or nipple 10 is closed by inserting therein a suitable plug or cork. The top portion of the inner surface of the receptacle 5 is amalgamated with mercury as at 25 to prevent the electrolyte from creeping up and passing under or over the said amalgamated rim and carrying alkaline zincate through the joint between the cover and the receptacle and which would immediately be resolved into powder form by exposure to the atmosphere with serious detriment to the cleanliness of the cell. This amalgamated rim also obstructs the loss of the alkaline zincate from the electrolyte by preventing creeping as just explained and particularly as it is essential that a certain percentage of alkaline zincate must be maintained in solution in the electrolyte. This presence of alkaline zincate in the electrolyte reduces the internal resistance of the cell to a minimum and very materially reduces the local action on the zinc receptacle 5. The electrolyte always remains in a cold state in contradistinction to thermo-cells where different degrees of heat are used to accelerate or increase the amperage.

As a matter of convenience in connecting up a plurality of the cells in parallel, as shown for instance by Fig. 4, each receptacle 5 has at one extremity an integral lug or boss 26 and applied over these lugs or bosses of the cells in the same horizontal series is a copper coupling strip 27, the remaining connection being between the projecting carbons or the caps 21 by means of copper plates 28 which are separably attached as at 29 for convenience in association and dissociation. The connection in series is accomplished through the medium of the grooves 12 in the bottoms of the successive cells and the copper capped carbon tongues or tenons 20 which are fitted in the said grooves, and by this means a plurality of the cells may be coupled up both in parallel and series. In coupling the cells in series as just explained a material advantage results as compared to the ordinary wiring wherein a certain ohm resistance is present and which in a large number of cells materially detracts from the efficiency or electromotive force of the connected group or groups.

Furthermore, structurally this simple mode of connecting the plurality of cells in series is convenient and expeditious and results in condensing the space of occupancy by dispensing with the use of connecting wires.

It is proposed in some instances to introduce in the electrolyte certain quantities of alkaline zincate prior to filling or supplying the receptacle 5 with the electrolyte in order to prevent a forceful attack on the zinc of the receptacle by the electrolyte in the first instance. This preliminary step will not in the least affect the chemical action of the electrolyte, but on the contrary has the advantage in that the internal resistance is materially lessened and which is the most essential feature of the present invention. The preservation of the necessary amount of alkaline zincate in the electrolyte or the retention of alkaline zincate in the electrolyte within the capacity of the latter is materially assisted by the amalgamated rim of mercury hereinbefore explained in view of the fact that there is no possibility of the loss of the zinc in solution.

What is claimed is:

1. In a battery cell, a receptacle having zinc embodied therein as one of its components and exposed interiorly of the receptacle, an insulating cover for sealing the receptacle having an opening through the center thereof, the bottom of the receptacle having a longitudinal groove extending fully from one end to the other thereof, a carbon plate suspended from the said insulating cover into the receptacle and having a central projection extending through the opening the cover above the top surface of the latter, a metallic covering over the portion of the projection of the carbon plate extending above the upper surface of the insulating cover to protect the end of the said carbon projection and adapted for engagement with the groove in the bottom of a companion cell, the proportions of the carbon projection with its metal cover and the groove in the bottom of the cell being such that the said groove will receive the projection of an adjacent cell, and an electrolyte in the receptacle.

2. In a battery cell, a receptacle having zinc embodied therein as one of its components and exposed interiorly of the receptacle, an insulating cover for sealing the receptacle having an opening through the center thereof, the bottom of the receptacle having a longitudinal groove extending fully from one end to the other thereof, a carbon plate suspended from the said insulating cover into the receptacle and having a central projection extending through the opening in the cover above the top surface of the latter to engage in the bottom groove of a companion cell, the proportions of the carbon projection and the groove in the bottom of the cell being such that the said groove will receive the projection of an adjacent cell, one end of the receptacle also having a metal covered projection to serve as an electrical connecting means, and a cold alkaline electrolyte in the receptacle.

3. A battery cell comprising a receptacle containing zinc as a part thereof and interiorly exposed, an insulating cover sealing the receptacle, a carbon plate suspended from the cover into the receptacle and having a portion thereof extending through said cover for electrical connection, one end of the receptacle having a metal covered projection to serve as the remaining electrical connecting means, a fabric casing fully inclosing the portion of the carbon plate within the receptacle, and a cold alkaline electrolyte in the receptacle.

In testimony whereof I have hereunto set my hand in presence of two subscribing witnesses.

GEORGE S. ENGLE.

Witnesses:
  CHAS. S. HYER,
  JAMES L. NORRIS, Jr.

---

Copies of this patent may be obtained for five cents each, by addressing the "Commissioner of Patents, Washington, D. C."